United States Patent
Nguyen et al.

(10) Patent No.: US 7,782,765 B2
(45) Date of Patent: Aug. 24, 2010

(54) DISTRIBUTED PROTECTION SWITCHING ARCHITECTURE FOR POINT-TO-POINT MICROWAVE RADIO SYSTEMS

(75) Inventors: Thanh H. Nguyen, Dollard-des-Ormeaux (CA); Andrey A. Kochetkov, Cary, NC (US)

(73) Assignee: Harris Stratex Networks Operating Corporation, Morrisville, NC (US)

( * ) Notice: Subject to any disclaimer, the term of this patent is extended or adjusted under 35 U.S.C. 154(b) by 733 days.

(21) Appl. No.: 11/655,837

(22) Filed: Jan. 22, 2007

(65) Prior Publication Data

US 2008/0175141 A1    Jul. 24, 2008

(51) Int. Cl.
G08C 15/00    (2006.01)
G06F 11/00    (2006.01)

(52) U.S. Cl. .................. 370/219; 370/220; 370/228
(58) Field of Classification Search ......... 370/216–228, 370/242–252; 709/232–236
See application file for complete search history.

(56) References Cited

U.S. PATENT DOCUMENTS

| | | | |
|---|---|---|---|
| 4,961,190 A | 10/1990 | Nakajima | |
| 5,329,520 A * | 7/1994 | Richardson | 370/225 |
| 5,740,157 A | 4/1998 | Demiray et al. | |
| 5,797,043 A * | 8/1998 | Lewis et al. | 710/56 |
| 5,822,553 A * | 10/1998 | Gifford et al. | 710/305 |
| 5,956,324 A | 9/1999 | Engdahl et al. | |
| 5,991,312 A | 11/1999 | Koenig et al. | |
| 6,513,092 B1 | 1/2003 | Gorshe | |
| 6,560,202 B1 * | 5/2003 | Bordogna et al. | 370/248 |
| 6,687,217 B1 | 2/2004 | Chow et al. | |
| 6,950,654 B2 | 9/2005 | Jao et al. | |
| 2002/0097737 A1 | 7/2002 | Traverso et al. | |

FOREIGN PATENT DOCUMENTS

WO    PCT/US08/51210    5/2008

* cited by examiner

*Primary Examiner*—Tri H Phan
(74) *Attorney, Agent, or Firm*—Sheppard, Mullin, Richter & Hampton LLP

(57) ABSTRACT

A system and method for protecting a received data stream. Active receivers and standby receivers are provided, each adaptable to receive a data stream on a traffic channel. Plural data processing units are operatively in communication with the receivers. At least one of the plural DPUs provides a switching signal to the receivers to switch the state of the active receiver to standby and the state of the standby receiver to active as a function of a quality measurement of the received data stream via the traffic channel.

31 Claims, 4 Drawing Sheets

DISTRIBUTED PROTECTION SWITCHING ARCHITECTURE FOR POINT-TO-POINT MICROWAVE RADIO SYSTEMS

BACKGROUND

Protection switching is an essential feature in microwave and millimeter wave radio systems to meet system reliability objectives. There exist many different methods and systems to achieve an increase in system reliability and availability of protection switching. For example, a typical protection switching architecture may be realized as redundant sets of modules that are subparts of a higher level component and implement functions of the component. The component may be structured and controlled such that there are redundant modules for each feature or group of features of importance. In such an architecture there generally are at least two modules which implement each important function. These modules are typically referred to as redundant modules or redundant module sets. Prior art protection switching is generally constructed of one or more sets of these redundant modules, the premise being if a currently selected set fails, one other unselected set may be promptly substituted for the failed set and the component can resume providing communication or the relevant function.

A methodology and mechanism is required to control and communicate information regarding control of which of the redundant sets is the active or standby set. When this function is structured to operate without intervention of separate equipment or entities, it is commonly referred as automatic protection switching. In prior art radio systems, these switching decisions are generally made by a central controller. For example, prior art radio systems typically utilize a single central controller responsible for the control of protection switches based upon component and path alarms collected from various modules in a system. As a result, when the controller fails, no further switch decisions may be made, and the corresponding protection switch is frozen at its last state. Thus, any further component, equipment or path failures may result in a traffic or communication outage. Further, prior art mechanisms utilized to communicate with the central controller and any queuing associated therewith add delay in the reconfiguration of the component or equipment. Therefore, it is desirable to realize protection switching as a distributed solution so that communication may be protected from single failures.

Typical prior art automatic protection systems for network elements have also generally comprised, for example, redundant facility equipment wherein a detected failure in one of the redundant sides results in a switch from one redundant side to the other. In such an architecture, an entire line of protection equipment is substituted for another even if a failure occurred in only one place in the working channel. Such an approach is inflexible since it fails to maximize available equipment. Moreover, switching decisions are typically made by the system controller, and all information relevant to the protection switching decision must still be sent to the system controller. Since the system controller services all information in this type of architecture, a significant amount of time is required to accomplish the switchover, and all the elements on the data path are still required to be switched during a switching event.

SUMMARY

It is apparent that the aforementioned processes are inefficient and fail to provide the necessary redundant protection switching required in microwave and millimeter wave radio systems. Accordingly, there is a need for a novel method and system that would overcome the deficiencies of the prior art. A further need exists for distributed protection switching in microwave and millimeter wave radio systems. Thus, embodiments of the present subject matter may employ a distributed protection switching architecture providing individual controllers on plural intelligent modules involved in a protection redundant path. Embodiments of the present subject matter may also provide distributed alarm collection and switch decision making as well as switch execution among the intelligent modules. Additional embodiments of the present subject matter may also provide an exchange of information between modules through an in-band communication protocol. Embodiments of the present subject matter thus eliminate single failure points that could render a protection switch inoperative, and thus improve a radio communication system's reliability.

An embodiment of the present subject matter provides a method for providing distributed protection switching in a communications system. The method generally includes a step of providing a plurality of communication modules at least one of which being in an active state and at least one other of which being in a standby state. In this embodiment, the method comprises the steps of providing an active receiver and a standby receiver, each provided with a switching controller and adaptable to receive a data stream, and additionally providing a plurality of data processing units (DPUs) operatively in communication with the active receiver and the standby receiver. The method further comprises measuring the quality of the data stream by the switching controllers in the receivers, providing a signal to the plurality of DPUs as a function of the quality measurement of the received data stream, and processing the signal at one or more of the plurality of DPUs. A switching signal may then be provided from at least one of the plurality of DPUs to switch the state of the active receiver to standby and the state of the standby receiver to active in response to the switching signal.

Another embodiment of the present subject matter provides another method for providing distributed protection switching in a communications system. This method comprises the steps of providing an active receiver and a standby receiver, each adaptable to receive a data stream on a traffic channel and providing a plurality of DPUs each of which adapted for individually making a switching decision and being operatively in communication with the active and standby receivers. This method further comprises providing a switching signal from at least one of the plurality of DPUs to switch the state of the active receiver to standby and the state of the standby receiver to active as a function of a quality measurement of the received data stream via the traffic channel.

A further embodiment of the present subject matter provides a system for providing distributed protection switching. Such system generally comprises a plurality of communication modules of which there may be a predetermined number of active receivers and a plurality of a predetermined number of standby receivers. This system has also a plurality of a predetermined number of DPUs. At least one of the active receivers and at least one of the standby receivers further comprise a switching controller operative to provide a signal as a function of a quality measurement of a received data stream, the controller adaptable to change the state of its respective receiver from standby to active or vice-versa. The DPUs further comprise a switching unit operatively in communication with the switching controllers, capable of receiving the signal, and of providing a switching signal to at least one switching controller to change the state of its respective receiver.

An additional embodiment of the present subject matter is yet another method for providing distributed protection switching in a communication system with a plurality of communication modules. This method comprises the steps of providing an active module and a standby module, each adaptable to transmit or receive a data stream and measure the quality of the data stream. The method further comprises providing a plurality of DPUs operatively in communication with the active module and the standby module, and communicating signals to the plurality of DPUs from the active and standby modules in response to which such DPUs make a switching decision as a function of the quality measurement. The method further includes communicating a switching signal in response to the switching decision being to switch state. The state of the active module may then be switched to standby and the state of the standby module to active in response to the switching signal provided from at least one of the plurality of DPUs via the traffic channel.

These embodiments and many other objects and advantages thereof will be readily apparent to one skilled in the art to which the invention pertains from a perusal of the claims, the appended drawings, and the following detailed description of the embodiments.

DETAILED DESCRIPTION

With reference to the figures where like elements have been given like numerical designations to facilitate an understanding of the present subject matter, the various embodiments of a method and system for distributed protection switching in a radio system are herein described.

Figure 1:
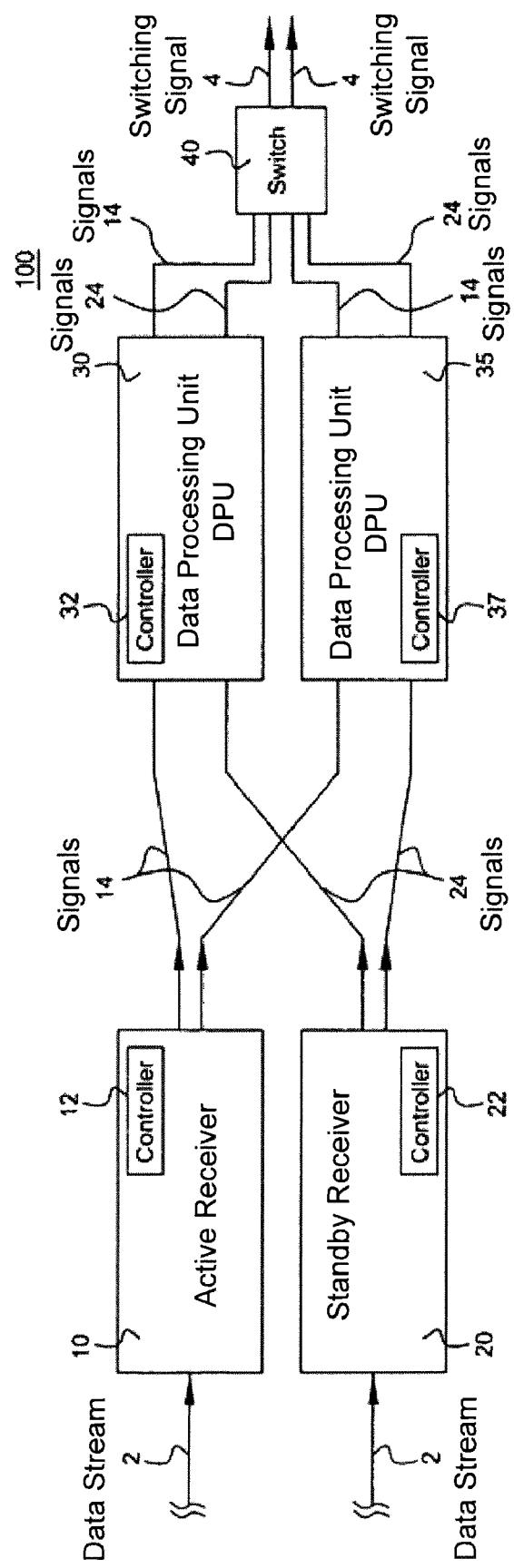
FIG. 1 is a distributed protection system according to an embodiment of the present subject matter.

FIG. 1 is a distributed protection system according to an embodiment of the present subject matter. With reference to FIG. 1, a system 100 is provided comprising an active receiver 10 and a standby receiver 20. The active receiver 10 may include a switching controller 12 adaptable to provide a signal 14 as a function of a quality measurement of a received data stream 2. Similarly, the standby receiver 20 may also include a switching controller 22 adaptable to provide a signal 24 as a function of a quality measurement of the received data stream 2. The signals 14, 24 may be utilized to change the state of the active receiver 10 from active to standby and the state of the standby receiver 20 from standby to active. The quality measurement may be a function of the signal strength, signal to noise ratio, bit error rate, and/or received power level of the received data stream 2. While one active receiver 10 and one standby receiver 20 are shown, such an illustration is not intended to limit the scope of the claims appended herewith. For example, the number of active receivers 10 may be greater than, less than, or equal to the number of standby receivers 20. Further, while the instant embodiment is presently discussed with reference to receivers, the present subject matter is equally applicable to transmitters. Embodiments of the present subject matter may also be modularized, that is, the receivers may be receiver modules and the transmitters may be transmitter modules.

The system further comprises a plurality of data processing units (DPUs) 30, 35 comprising a switching unit 40 and switching controllers 32, 37. The, DPUs 30, 35 are operatively in communication with the switching controllers 12, 22. Additional or fewer DPUs may be provided in the system as necessary. The DPUs 30, 35 may generally communicate with the switching controllers 12, 22 via an in-band communication protocol. The in-band communication protocol may be based upon the concept of shared register with interrupt notification of change of state. This communication may be employed between the DPUs 30, 35 or DPU modules and each of the receivers or modules involved in the protection switching. For example, a total of 64 bit registers may be implemented for each point-to-point link between two modules. The information provided may be processed as a single entity and a flag bit utilized at each end of the link to prevent partial transmission of information during updates. Thus, the in-band communication may link modules directly involved in the protection switching to eliminate unnecessary dependence on other modules such as a system controller. Furthermore, since the communication is in-band, as long as data traffic is passing through, the information required for protection switching is available to make a switch decision.

The switching controllers may collect data, alarms and/or threshold information and provide such to the DPUs 30, 35 where the data, etc. is processed and a switching decision made and provided to the switching unit 40. The switching controllers 12, 22 may be in communication with the DPUs 30, 35 via a network line such as a SONET line, OC-12 line, OC-24 line, OC-48 line or other optical carrier line. The switching unit 40 may be a 1+1 receiver hitless switch, 1+1 monitored hot standby switch, line interface unit 1+1 switch, data processing unit 1+1 switch, or other switching means utilized in the art. The switching unit 40 is capable of receiving signals 14, 24 and providing a switching signal 4 to at least one of the switching controllers 12, 22 to change the state of the respective active receiver 10 and/or standby receiver 20. The switching signal 4 may be provided to the respective receivers 10, 20 via a channel carrying the data stream 2. Further, the switching signal 4 may be a synchronous transport signal, e.g., STS-1, etc.

Thus, switching decisions may be distributed among receivers and/or modules, dependent upon the type of protection switching scheme employed. For example, in a system employing a 1+1 receiver switch, the DPUs 30, 35 process receiver alarms, make the switching decision and execute the decision. Therefore, due to the redundancy of the DPUs 30, 35, the prior art problem of inoperative protection switching due to controller failure may be eliminated. Further by example, in a prior art 1+1 redundant system, system unavailability may be provided by the following relationship:

$$U=U_S+U_B^2+U_B*U_{PSW} \tag{1}$$

$U_S$ represents the series path unavailability, $U_B$ the parallel path unavailability, and $U_{PSW}$ the unavailability of protection control circuitry. Systems and methods employing embodiments of the present subject matter provide system unavailability according to the following relationship:

$$U=U_S+U_B^2+U_B*(U_{PSW})^2 \tag{2}$$

Thus, the third term in the second equation, $U_B*(U_{PSW})^2$, is of a third order and becomes negligible when compared to the second term, $U_B^2$. Therefore, due to the distributed redundant controller architecture of the present subject matter coupled with redundant in-band protection switching signaling links, the overall reliability of the protection switch feature and consequently system reliability may be greatly enhanced.

Figure 2:
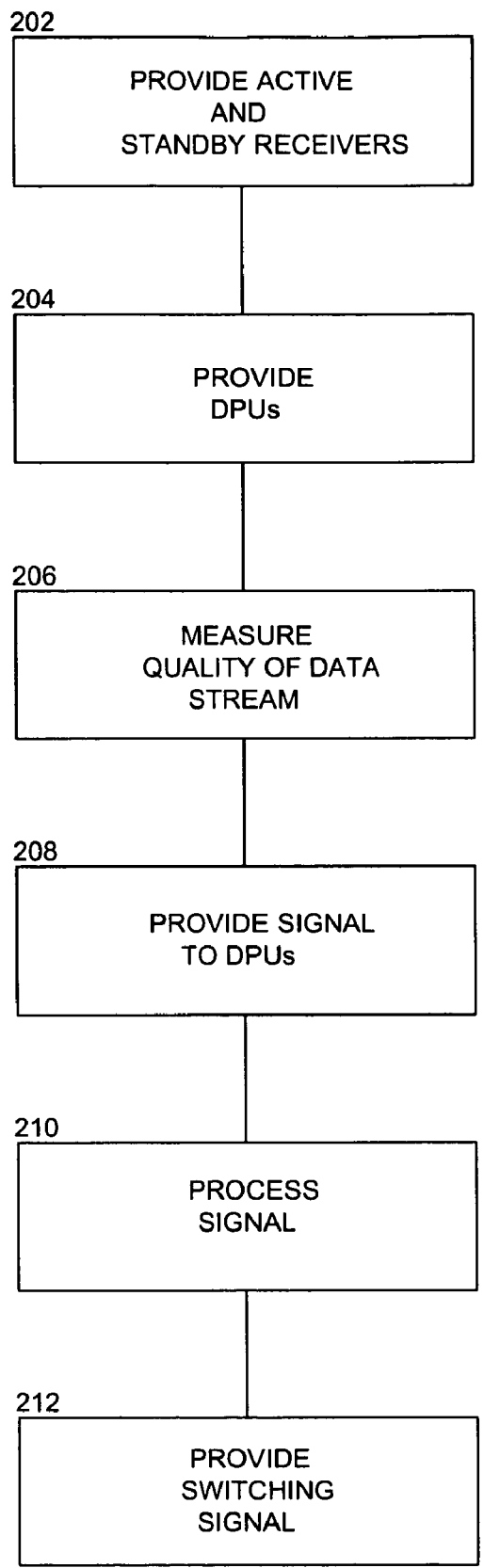
FIG. 2 is a flowchart illustrating a method for protecting a received data stream according to an embodiment of the present subject matter.

FIG. 2 is a flowchart illustrating a method for protecting a received data stream according to an embodiment of the present subject matter. With reference to FIG. 2, in step 202, an active receiver and a standby receiver are provided. Each of the receivers is adaptable to receive a data stream. In step 204, plural DPUs are provided operatively in communication with the active and standby receivers. The quality of the data stream may be measured by the active and standby receivers in step 206. A signal may then be provided to the plural DPUs as a function of a quality measurement of the received data stream in step 208. The quality measurement may be a signal strength, signal to noise ratio, bit error rate, and/or received power level of the received data stream.

In an alternative embodiment, this signal may be based on communicating by shared register with an interrupt notification of change of state. Further, the interrupt notification may be provided as a function of a flag bit at the end of a portion of the data stream. The signal is processed in at least ones of the plural DPUs in step 210, and a switching signal is provided from the at least one of the plural DPUs in step 212. The switching signal may be utilized to switch the state of the active receiver to standby and the state of the standby receiver to active. In an additional embodiment of the present subject matter, the switching signal may be provided via a channel carrying the data stream.

Figure 3:
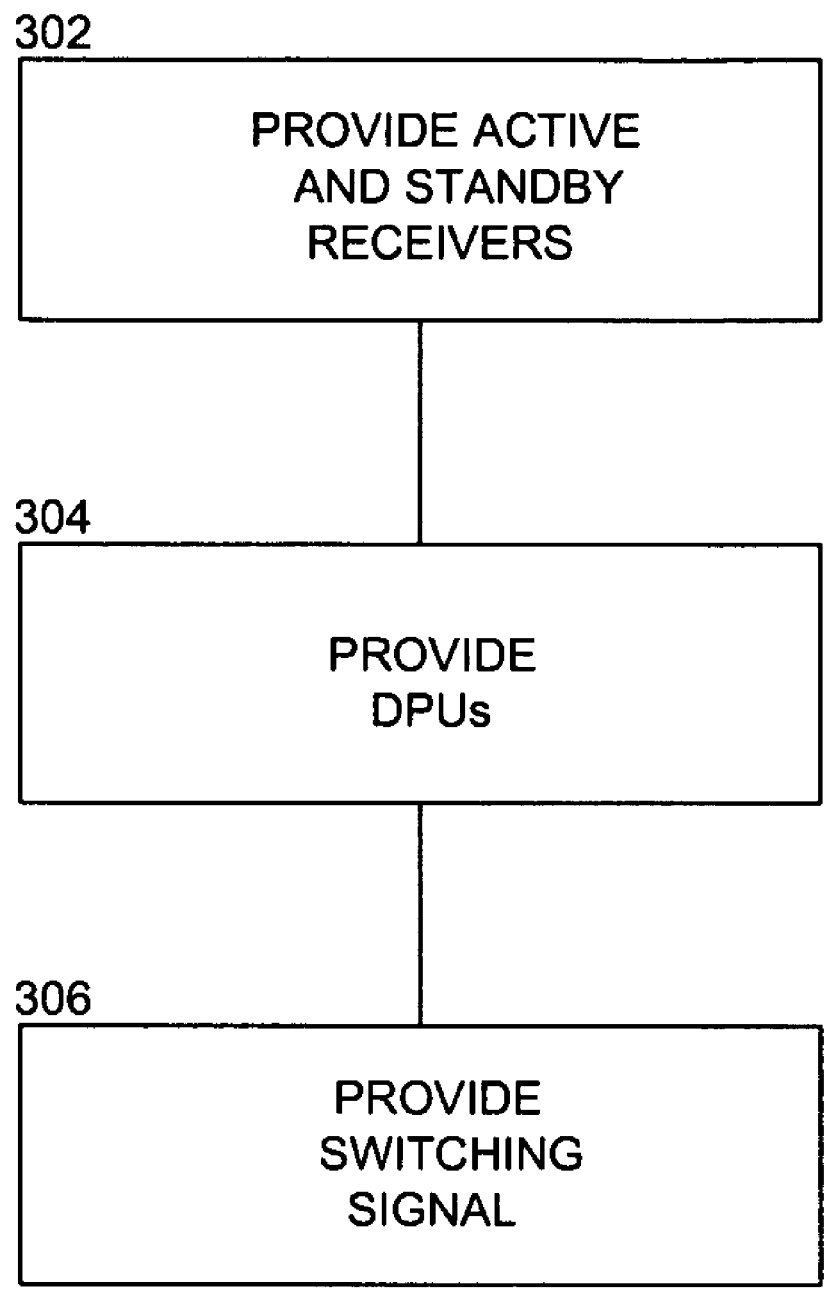
FIG. 3 is a flowchart illustrating another method for protecting a received data stream according to an embodiment of the present subject matter.

FIG. 3 is a flowchart illustrating another method for protecting a received data stream according to an embodiment of the present subject matter. With reference to FIG. 3, in step 302, an active receiver and a standby receiver are provided. Each of the receivers is adaptable to receive a data stream on a traffic channel. In step 304, a plurality of DPUs may be provided operatively in communication with the active and standby receivers. A switching signal may then be provided from at least one of the plural DPUs in step 306. The switching signal may be utilized to switch, via the traffic channel, the state of the active receiver to standby and the state of the standby receiver to active as a function of a quality measurement of the received data stream. Of course, the quality measurement may be a signal strength, signal to noise ratio, bit error rate, and/or received power level of the received data stream. An alternative embodiment of the present subject matter may further measure the quality of the data stream by the receivers, provide a signal to the DPUs as a function of the quality measurement, and process the signal at one or more of the plural DPUs. The signal provided to the plural DPUs may be based upon the concept of shared register with an interrupt notification of change of state. Further, the interrupt notification may be provided as a function of a flag bit at the end of a portion of the data stream.

Figure 4:
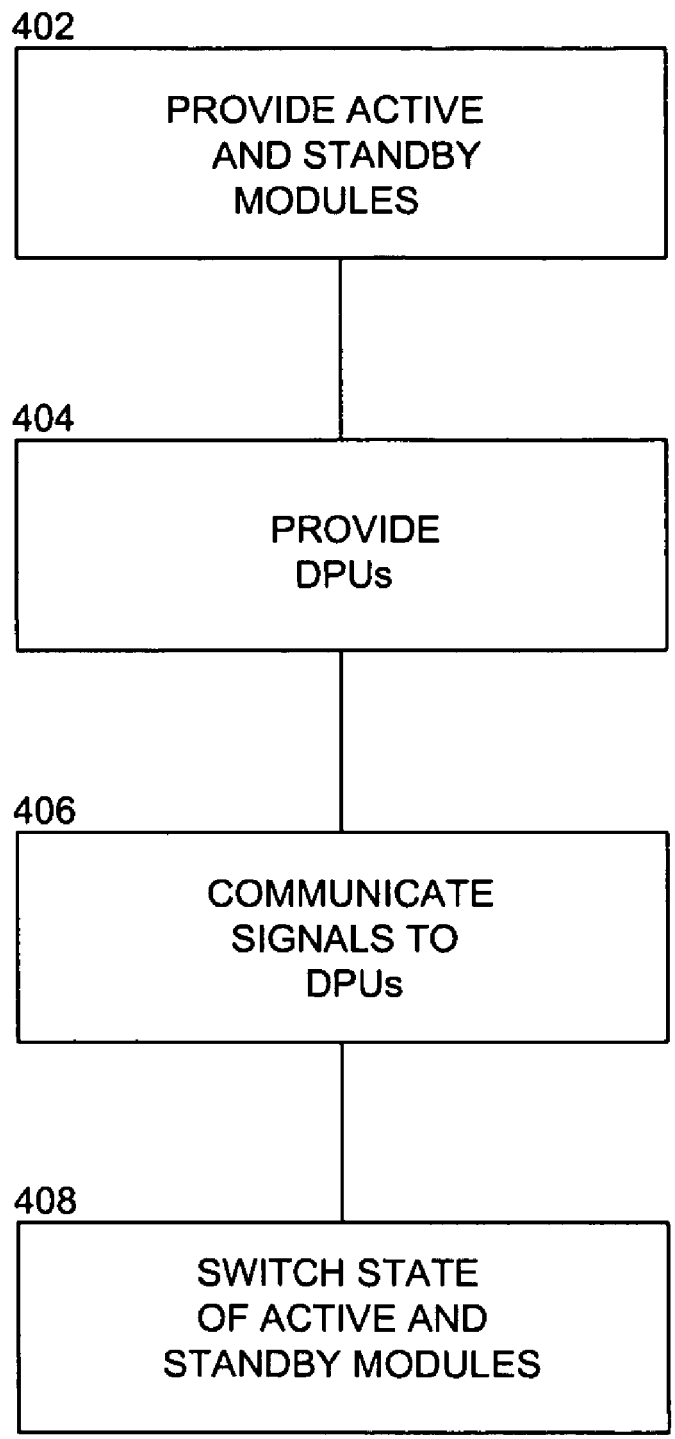
FIG. 4 is a flowchart illustrating a method for communicating between redundant controllers and plural microwave modules according to an embodiment of the present subject matter.

FIG. 4 is a flowchart illustrating a method for communicating between redundant controllers and plural microwave modules according to another embodiment of the present subject matter. With reference to FIG. 4, in step 402, an active module and a standby module are provided. Each of the modules is adaptable to transmit or receive a data stream and measure the quality of the data stream. The modules may be receiver or transmitter modules. Plural DPUs are provided in step 404. Each of the plural DPUs is operatively in communication with the active and standby modules. In step 406, signals are communicated to one or more of the plural DPUs from the active and standby modules. Any number of DPUs may be provided, e.g., 1, 2, 3, 4, etc. to which the signals may be communicated. The signals may be communicated as a function of a quality measurement of the received data stream. The signals communicated to the one or more of the plural DPUs may be based upon the concept of shared register with an interrupt notification of change of state. Further, the interrupt notification may be provided as a function of a flag bit at the end of a portion of the data stream. Of course, the quality measurement may be a signal strength, signal to noise ratio, bit error rate, and/or received power level of the received data stream. In step 408, the state of the active module may be switched to standby and the state of the standby module may be switched to active in response to a switching signal provided from any one of the plural DPUs via the traffic channel. In an alternative embodiment of the present subject matter, any one but not all of the DPUs may provide the switching signal.

It is thus an aspect of embodiments of the present subject matter to resolve single point failure problems in single or system controllers of conventional protection switching architectures.

As shown by the various configurations and embodiments illustrated in FIGS. 1-4, a method and system for distributed protection switching in a microwave or millimeter wave radio system have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for providing distributed protection switching in a communication system, comprising the steps of:
   providing a plurality of communication modules at least one of which being in an active state and at least one other of which being in a standby state, each of the plurality of communication modules having a switching controller and being operative to process a data stream;
   providing a plurality of data processing units (DPUs) operatively connected to the switching controllers in the plurality of the communication modules;
   performing quality measurements of said data stream by said switching controllers;
   providing a signal from the switching controllers to each of the plurality of DPUs as a function of the quality measurements of said data stream;
   making a switching decision, by one or more of the plurality of DPUs, based on the signals respectively received from the switching controllers; and
   providing a switching signal from at least one of said plurality of DPUs in response to the switching decision being to switch the active state to a standby state and the standby state to the active state.

2. The method of claim 1, wherein said switching signal is provided via a channel carrying said data stream.

3. The method of claim 1, wherein the step of providing the signals to said plurality of DPUs comprises using a shared register with an interrupt notification of change of state.

4. The method of claim 3, wherein said interrupt notification is provided as a function of a flag bit in said data stream.

5. The method of claim 1, wherein said quality measurement includes measuring signal strength, signal to noise ratio, bit error rate, received power level, or any combination thereof.

6. The method of claim 1, wherein the communication modules include receivers, transmitters, or both.

7. The method of claim 1, further comprising providing the switching signal to the communications module via a traffic channel that carries the data stream.

8. A method for providing distributed protection switching in a communications system, comprising the steps of:
providing a receiver in an active state and a receiver in a standby state, said receivers being adapted to receive a data stream on a traffic channel and perform a quality measurement of the received data stream;
providing a plurality of data processing units (DPUs), each of which is adapted for individually making a switching decision, each of the DPUs in said plurality of DPUs operatively in communication with each of said receivers; and
providing a switching signal from at least one of said plurality of DPUs based on the switching decision to switch the active state to a standby state and the standby state to an active state, wherein the switching decision is made as a function of the quality measurement of said received data stream.

9. The method of claim 8, wherein said quality measurement includes measuring signal strength, signal to noise ratio, bit error rate, received power level, or any combination thereof.

10. The method of claim 8, further comprising providing the switching signal to the receivers via the traffic channel.

11. The method of claim 8, wherein the step of providing the signal to said plurality of DPUs uses a shared register with an interrupt notification of change of state.

12. The method of claim 11, wherein said interrupt notification is provided as a function of a flag bit in said data stream.

13. The method of claim 8, wherein each of the receivers includes a switching controller for performing the quality measurement on the data stream and providing a signal to the plurality of DPUs responsive to such quality measurement.

14. A system for providing distributed protection switching, comprising:
a plurality of communication modules of which there is a predetermined X number of communication modules in an active state;
a predetermined Y number of communication modules in a standby state, wherein at least one of said communication modules in the active state and at least one of said communication modules in the standby state include a switching controller operative to perform a quality measurement of a data stream and produce a signal based on the quality measurement, said switching controller being further operative to change the state of its respective communication module from standby to active or vice-versa;
a predetermined Z number of data processing units (DPU) operative to receive the signals from each of said switching controllers and, in response thereto, make a switching decision, said DPUs further comprising; and
a switching unit operative to produce a switching signal if the switching decision is to switch state and communicate the switching signal to said switching controllers in order to change the state of their respective communication modules.

15. The system of claim 14, wherein said switching unit is selected from the group consisting of: 1+1 receiver hitless switch, 1+1 monitored hot standby switch, line interface unit 1+1 switch, and data processing unit 1+1 switch.

16. The system of claim 14 wherein the predetermined X number is higher than Y.

17. The system of claim 14, wherein the predetermined X number is lower than Y.

18. The system of claim 14, wherein the predetermined X number is equal to Y.

19. The system of claim 18, wherein the predetermined X number is equal to Z.

20. The system of claim 14, wherein the predetermined Z number is equal to two.

21. The method of claim 14, wherein said switching signal is provided via a channel carrying said data stream.

22. The system of claim 14, wherein said quality measurement includes measuring signal strength, signal to noise ratio, bit error rate, and received power level, or any combination thereof 23. The method of claim 14, wherein the communication modules include receivers, transmitters, or both.

24. A method for providing distributed protection switching in a communications system with a plurality of communication modules comprising the steps of:
providing an active module and a standby module, each of said modules adapted to process a data stream and including a switching controller operative to perform quality measurement of said data stream;
providing a plurality of data processing units (DPUs), each of which is operatively in communication with the switching controllers of both of said active and standby modules;
communicating signals to one or more of said plurality of DPUs from said active and standby modules in response to which such DPUs make a switching decision as a function of the quality measurement of said data stream;
communicating a switching signal from at least one of said DPUs to the switching controllers in the active and standby modules if the switching decision is to switch state; and
switching the state of said active module to standby and the state of said standby module to active in response to the switching signal.

25. The method of claim 24, wherein the step of communicating signals to one or more of said plurality of DPUs comprises using a shared register with an interrupt notification of change of state.

26. The method of claim 25, wherein said interrupt notification is provided as a function of a flag bit in said data stream.

27. The method of claim 24, wherein said quality measurement includes measuring signal strength, signal to noise ratio, bit error rate, and received power level, or any combination thereof 28. The method of claim 24, wherein said modules are receiver modules.

29. The method of claim 24, wherein said modules are transmitter modules.

30. The method of claim 24, wherein the number of the plurality of DPUs is equal to two.

31. The method of claim 30, wherein any one but not both of said two DPUs provides said switching signal.

* * * * *